(12) United States Patent
Pajtas et al.

(10) Patent No.: US 8,230,756 B2
(45) Date of Patent: Jul. 31, 2012

(54) MANUAL TRANSMISSION REVERSE LOCKOUT SYSTEM

(75) Inventors: Charles Pajtas, Sterling Heights, MI (US); Shawn E. Bronner, Detroit, MI (US); Lisa Lortie, LaSalle (CA)

(73) Assignee: Chrysler Group LLC, Auburn Hills, MI (US)

( * ) Notice: Subject to any disclaimer, the term of this patent is extended or adjusted under 35 U.S.C. 154(b) by 194 days.

(21) Appl. No.: 12/856,886

(22) Filed: Aug. 16, 2010

(65) Prior Publication Data

US 2012/0036957 A1    Feb. 16, 2012

(51) Int. Cl.
*G05G 5/00* (2006.01)

(52) U.S. Cl. .................................................. 74/473.22

(58) Field of Classification Search .................. 74/473.3, 74/473.33, 473.15, 473.22, 500.5, 501.6
See application file for complete search history.

(56) References Cited

U.S. PATENT DOCUMENTS

| | | |
|---|---|---|
| 3,597,992 A | 8/1971 | Lowry et al. |
| 4,245,521 A | 1/1981 | Osborn |
| 4,343,202 A | 8/1982 | Osborn |
| 4,524,635 A * | 6/1985 | Hulin et al. ................. 74/473.22 |
| 4,693,135 A * | 9/1987 | LaRocca et al. ............ 74/473.21 |
| 5,651,290 A * | 7/1997 | Osborn et al. .............. 74/473.22 |
| 6,142,034 A | 11/2000 | Rempinski |
| 7,562,602 B2 * | 7/2009 | Blascok et al. ............. 74/473.22 |

FOREIGN PATENT DOCUMENTS

| | | | |
|---|---|---|---|
| EP | 551799 A1 | * | 7/1993 |
| EP | 1111276 A2 | * | 6/2001 |
| JP | 04307173 A | * | 10/1992 |

* cited by examiner

*Primary Examiner* — Vicky Johnson
(74) *Attorney, Agent, or Firm* — Frederick A. Krieger

(57) ABSTRACT

A shifter assembly may include a shift lever, an actuation member, a coupling, a first cable and a second cable. The shift lever may be connected to a housing for pivotable motion relative to the housing. The actuation member may be connected to the shift lever and may be movable relative thereto between a first position and a second position. The coupling may be connected to the shift lever and may include first and second members slidably engaging each other. The first cable may have a first end connected to the second member and a second end that can be coupled to a reverse lockout mechanism. The second cable may be connected to the actuation member and the second member of the coupling such that movement of the actuation member relative to the shift lever causes corresponding motion of the second member relative to the shift lever.

19 Claims, 7 Drawing Sheets

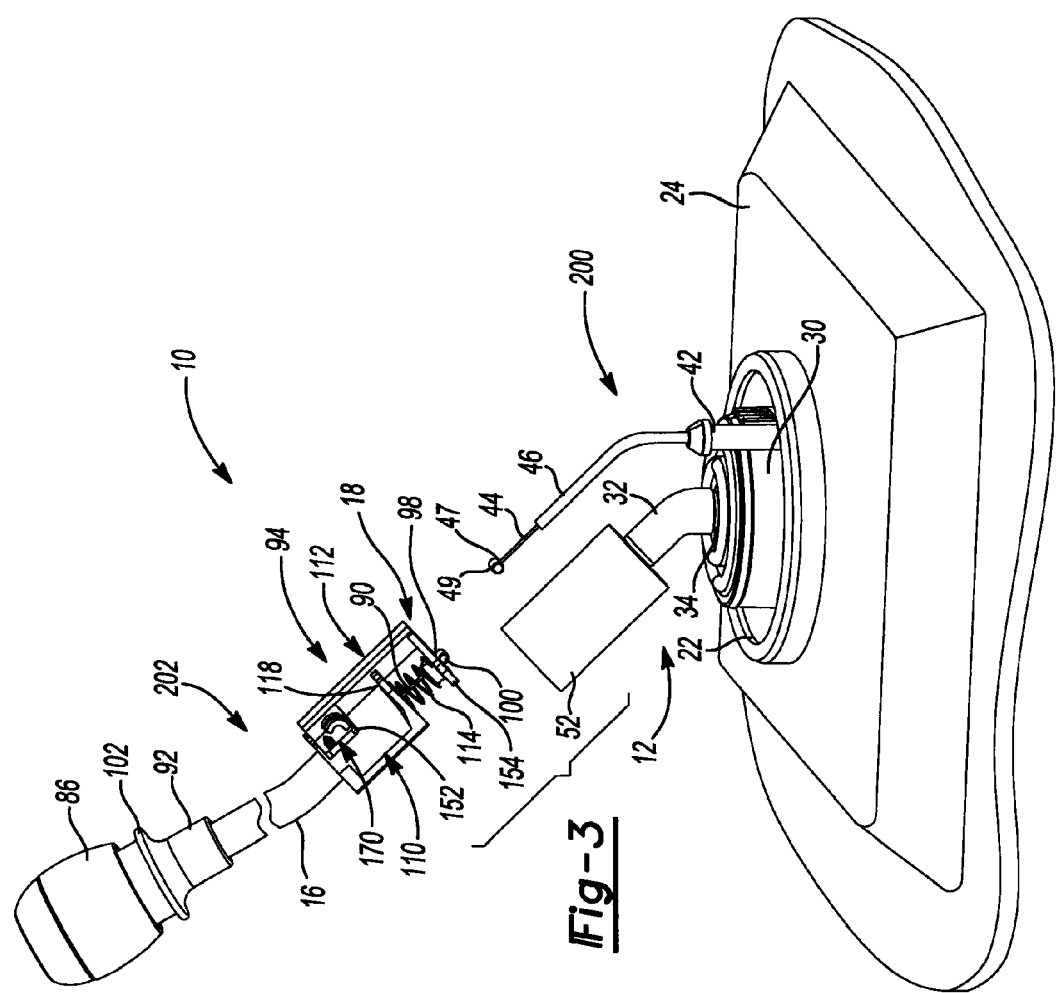

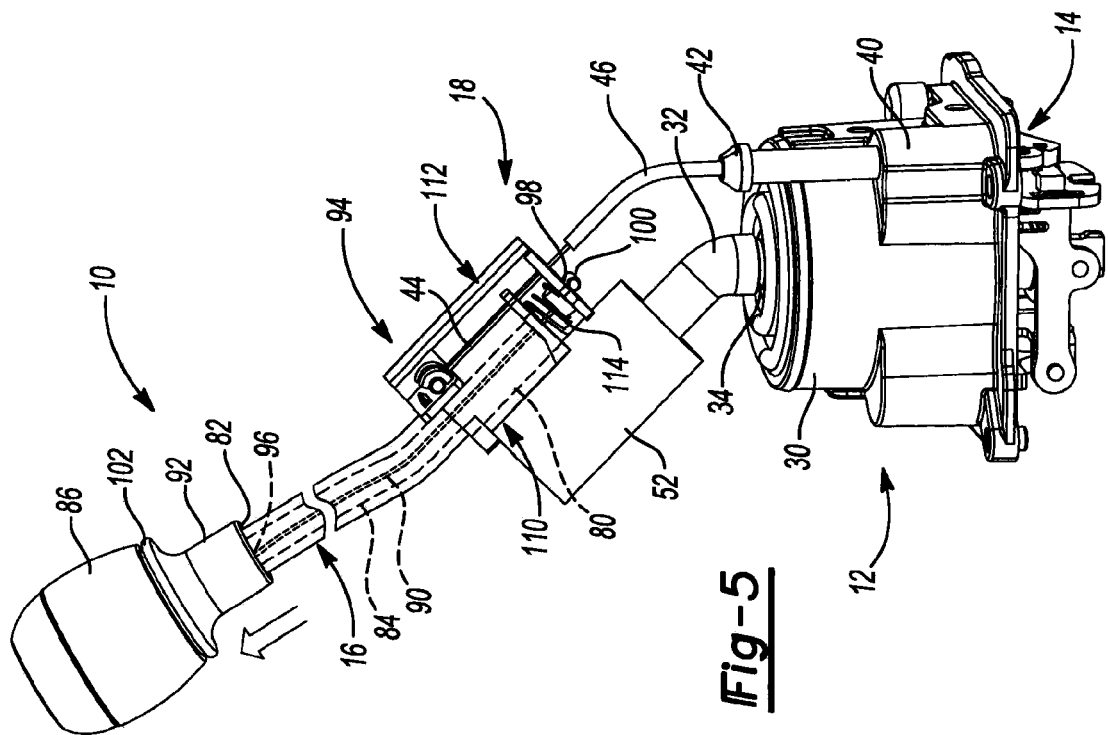
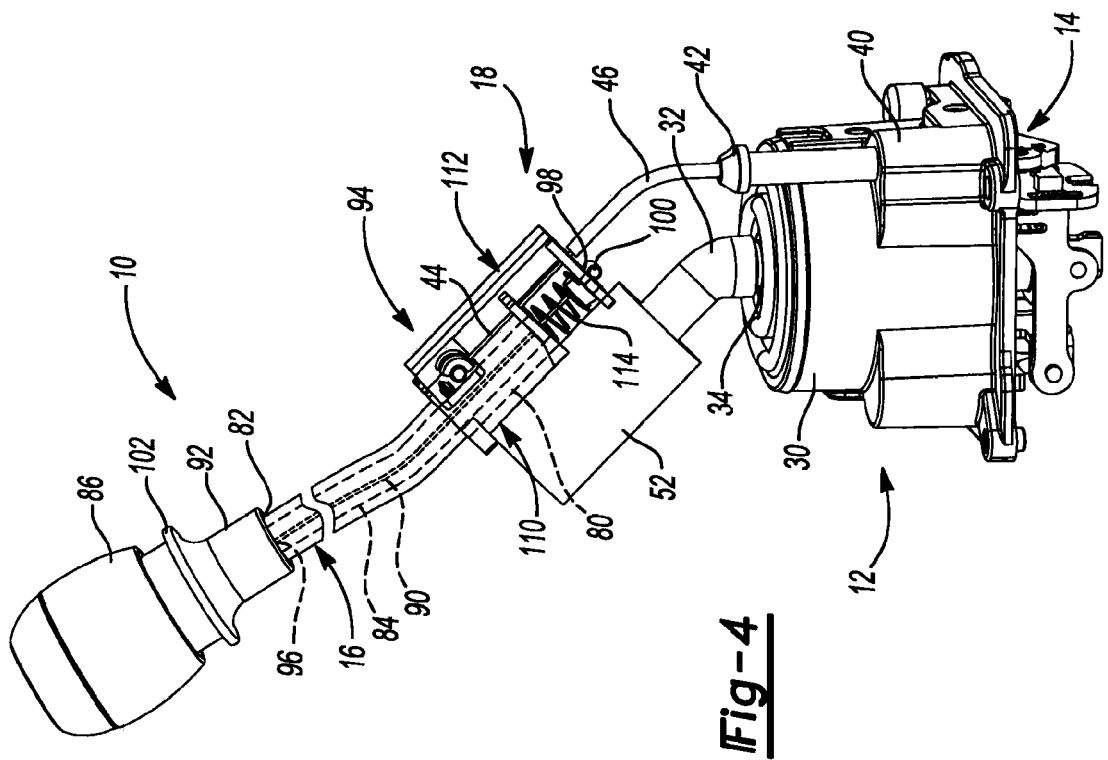

MANUAL TRANSMISSION REVERSE LOCKOUT SYSTEM

FIELD

The present disclosure relates generally to a shifter assembly for a manual transmission, and more particularly to a shifter assembly having a release mechanism for a reverse-gear lockout system.

BACKGROUND

Many automotive vehicles include a manual transmission having a shifter assembly that a driver of the vehicle operates to shift the transmission among a plurality of forward-gear positions, a reverse-gear position and a neutral position. While intending to shift between two of the forward-gear positions, drivers may occasionally inadvertently shift into the reverse-gear position while the vehicle is travelling forward. Engaging the reverse gear while the vehicle is travelling forward can grind gears and may cause damage to the transmission and/or other drivetrain components.

The present disclosure provides a shifter assembly that may impede or prevent a driver from inadvertently shifting the manual transmission into the reverse gear unless the driver takes an affirmative action when shifting into the reverse gear that may not be necessary for unimpeded shifting into the neutral position or any of the forward-gear positions.

SUMMARY

In one form, the present disclosure provides a shifter assembly that may include a shift lever, an actuation member, a coupling, a first cable and a second cable. The shift lever may be connected to a housing for pivotable motion relative to the housing. The actuation member may be connected to the shift lever and may be movable relative thereto between a first position and a second position. The coupling may be connected to the shift lever and may include first and second members slidably engaging each other. The first cable may have a first end connected to the second member and a second end that can be coupled to a reverse lockout mechanism. The second cable may be connected to the actuation member and the second member of the coupling such that movement of the actuation member relative to the shift lever causes corresponding motion of the second member relative to the shift lever. Movement of the actuation member from the first position to the second position can cause corresponding movement of the reverse lockout mechanism to allow movement of the shift lever into a reverse gear position.

In another form, the present disclosure provides a shifter assembly for a vehicle that may include a shift tower assembly, a shift lever, an actuation member, a coupling, a first cable and a second cable. The shift lever may include a first end and a second end. The shift tower assembly may connect the shift lever to a transmission component. The actuation member may slidably engage the shift lever proximate the first end. The coupling may be disposed at the second end of the shift lever and may include a first member movable relative to the shift lever. The first cable may have a first end engaging the coupling and a second end engaging a reverse lockout mechanism. The second cable may extend through the bore in the shift lever and may have a first end engaging the actuation member and a second end engaging the coupling. Movement of the actuation member may cause corresponding movement of the reverse lockout mechanism to allow unimpeded movement of the shift lever into a reverse gear position.

Further areas of applicability will become apparent from the description provided hereinafter. The description and specific examples in this summary are intended for purposes of illustration only and are not intended to limit the scope of the present disclosure.

BRIEF DESCRIPTION OF THE DRAWINGS

The present disclosure will become more fully understood from the detailed description, the appended claims and the following drawings. The drawings are for illustrative purposes only and are not intended to limit the scope of the present disclosure.

FIG. 3 is a partially exploded perspective view of the shifter assembly and a floor pan according to the principles of the present disclosure;

FIG. 4 is a perspective view of the shifter assembly in a first position;

FIG. 5 is a perspective view of the shifter assembly in a second position;

DETAILED DESCRIPTION

Figure 1:
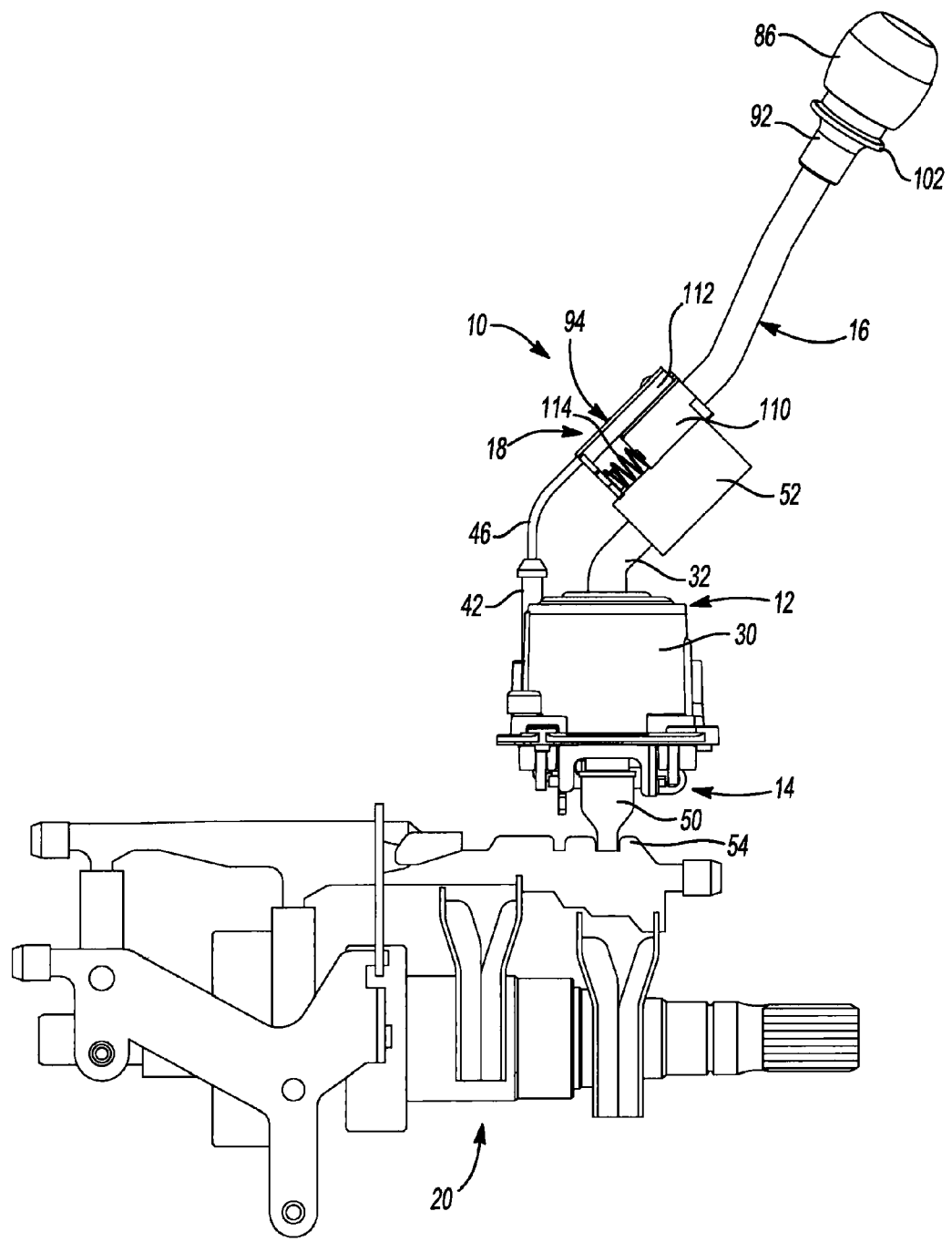
FIG. 1 is a side view of a manual transmission assembly having a shifter assembly connected thereto according to the principles of the present disclosure.
Figure 2:
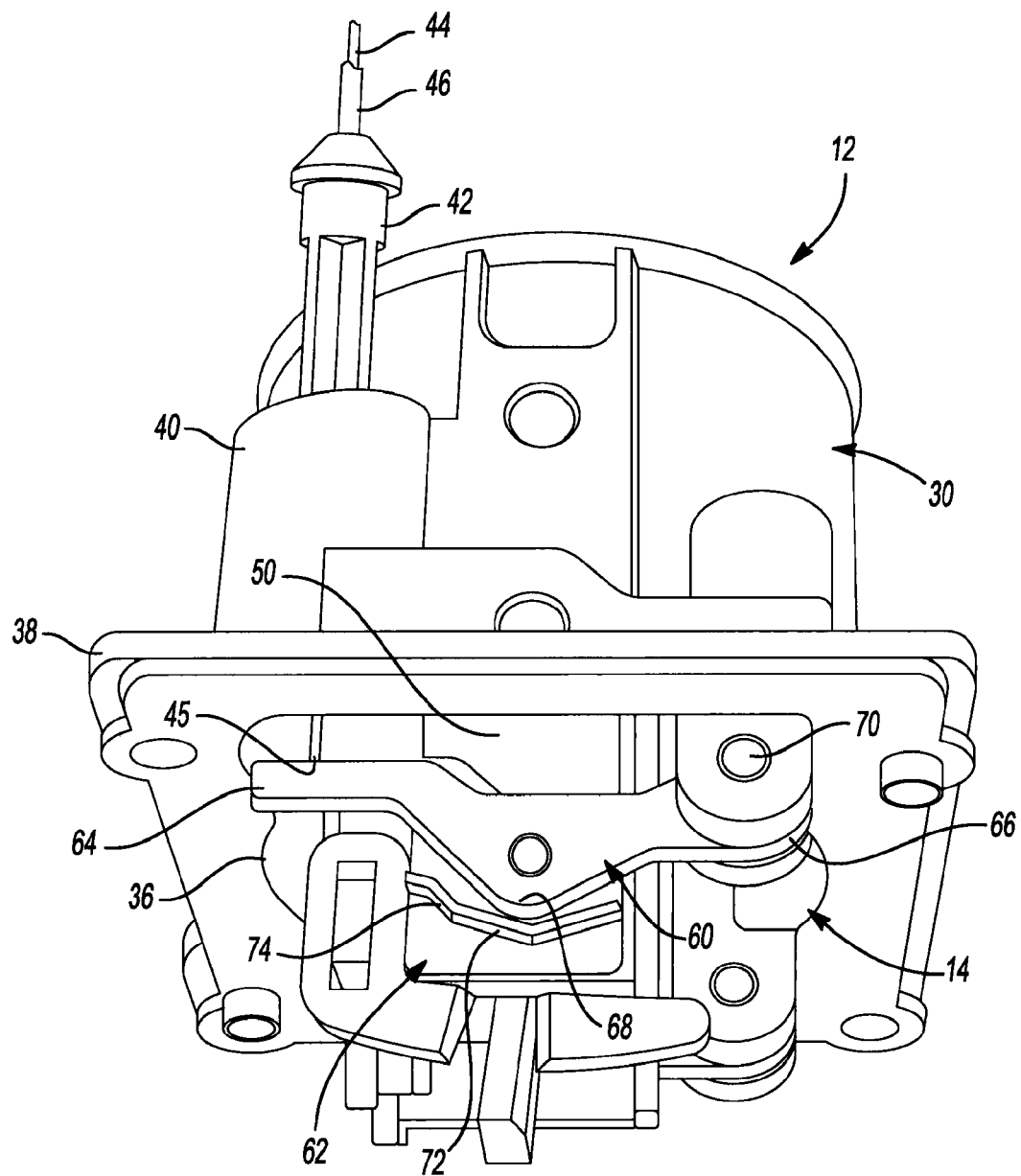
FIG. 2 is a bottom perspective view of a shift tower assembly of the shifter assembly of FIG. 1.

The following description is merely exemplary in nature and is not intended to limit the present disclosure, its application, or uses. It should be understood that throughout the drawings, corresponding reference numerals indicate like or corresponding parts and features.

With reference to FIGS. 1-9, a shifter assembly 10 is provided and may include a shift tower assembly 12, a reverse lockout mechanism 14, a shift lever 16, and a reverse lockout release mechanism 18. The shifter assembly 10 may be operatively connected to a manual transmission assembly 20 for a rear-wheel-drive or four-wheel-drive vehicle, for example. In one exemplary configuration, the shifter assembly 10 may be directly mounted to the manual transmission assembly 20. The shifter assembly 10 may protrude through an aperture 22 in a floor pan 24 (shown schematically in FIG. 3) that acts as a barrier between the transmission assembly 20 and an interior of the vehicle. A driver of the vehicle may operate the shifter assembly 10 to shift the transmission assembly 20 into any of a plurality of forward-gear positions, a reverse-gear position, and a neutral position. As will be subsequently described, the reverse lockout mechanism 14 may be operable to impede or prevent the driver from inadvertently shifting the transmission assembly 20 into the reverse-gear position unless the driver actuates the reverse lockout release mechanism 18 before or while shifting into the reverse-gear position.

The shift tower assembly 12 may include a housing 30 and a shift stub 32. The housing 30 may be a generally cylindrical and may include a hollow member having an upper aperture 34, a lower aperture 36, and a base 38. A generally hollow boss 40 may protrude from the base 38 along an outer perimeter of the housing 30. A relatively rigid cable guide 42 may be connected to the boss 40 and protrude upwardly therefrom. A first cable 44 may extend through the cable guide 42, the boss 40 and the lower aperture 36 of the housing 30. The first cable 44 may include a first end 45 and a second end 47. The second end 47 may include a stop 49 extending substantially perpendicular to first cable 44. A relatively flexible protective sheath 46 may be disposed around at least a portion of the first cable 44 to protect the first cable 44 from being damaged during assembly and/or operation, for example.

The shift stub 32 may be mounted to an interior surface of the housing 30 for pivotable motion relative to the housing 30. The shift stub 32 may include a shift finger 50 extending downward from the lower aperture 36 and a generally cylindrical base portion 52 extending generally upward from the upper aperture 34. The shift finger 50 may selectively engage one of a plurality of shift rails 54 to move the transmission assembly 20 into or out of a selected gear position.

The reverse lockout mechanism 14 may include a lever 60 and a lockout member 62. The lever 60 may include a first end 64, a second end 66, and a cam portion 68. The first end 64 may be attached to the first end 45 of the first cable 44. The second end 66 may be connected to the housing 30 for pivotable motion about a pin 70. The lockout member 62 may be connected to the shift stub 32 and may move from left to right (relative to the view shown in FIG. 2) when the shifter assembly 10 is shifting the transmission assembly 20 into a reverse gear. The lockout member 62 may include a ramp member 72 that slidably engages the cam portion 68 of the lever 60. The ramp member 72 may include an upwardly sloping portion 74 that impedes or prevents the lockout member 62 (and hence the shift stub 32 and shift finger 50) from moving into a position corresponding to the reverse-gear position when the lever 60 is in a first position (shown in FIG. 2). As will be subsequently described, an upward movement of the first cable 44 may cause the lever 60 to pivot about the pin 70 in a clockwise direction (relative to the view shown in FIG. 2) to disengage the cam portion 68 from the ramp member 72, thereby allowing unimpeded movement of the lockout member 62 (and hence the shift stub 32 and shift finger 50).

The shift lever 16 may be an elongated shaft having a first end 80, a second end 82, and a bore 84 extending at least partially between the first and second ends 80, 82. The first end 80 may be welded or otherwise secured to the base portion 52 of the shift stub 32. The second end 82 may include a handle or knob 86 that a driver may grip when shifting gears.

The reverse lockout release mechanism 18 may include a second cable 90, an actuation member 92, and a coupling 94, as shown for example in FIGS. 4 and 5. The second cable 90 may extend through the bore 84 in the shift lever 16. A first end 96 of the second cable 90 may be connected to the actuation member 92. A second end 98 of the second cable 90 may protrude from the bore 84 at the first end 80 of the shift lever 16 and may include a stop 100 engaging the coupling 94.

The actuation member 92 may be a generally tubular member slidably engaging the shift lever 16 proximate the second end 82 thereof and the knob 86. The first end 96 of the second cable 90 may be attached to an interior surface of the actuation member 92. The actuation member 92 may be movable between a first position (FIG. 4) and a second position (FIG. 5) which causes corresponding movement of the second cable 90 attached thereto. The actuation member 92 may include an annular rim, ring, collar or lip 102 that may be ergonomically shaped to facilitate gripping.

Figure 6:
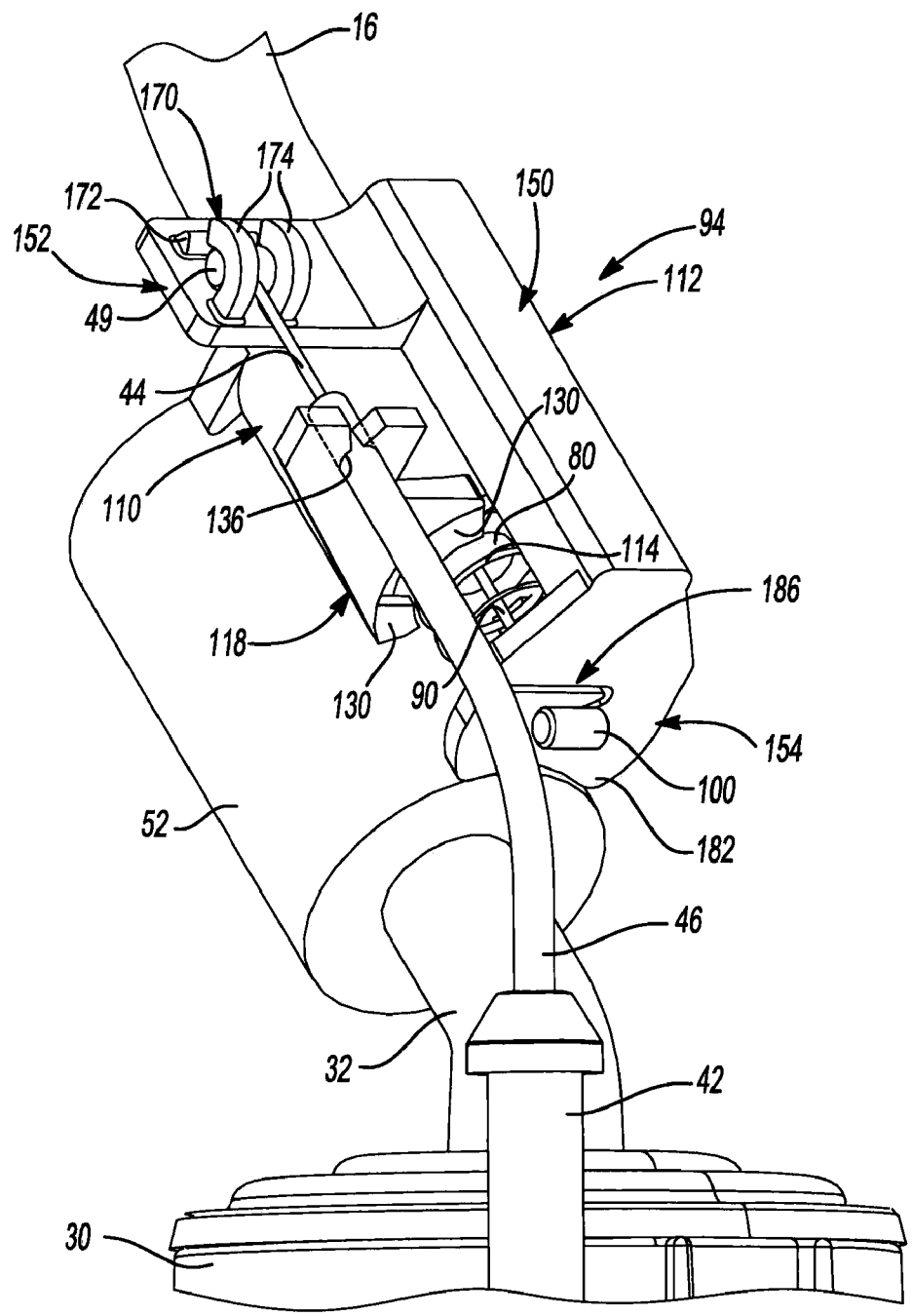
FIG. 6 is a partial perspective view of the shifter assembly of FIG. 1.
Figure 7:
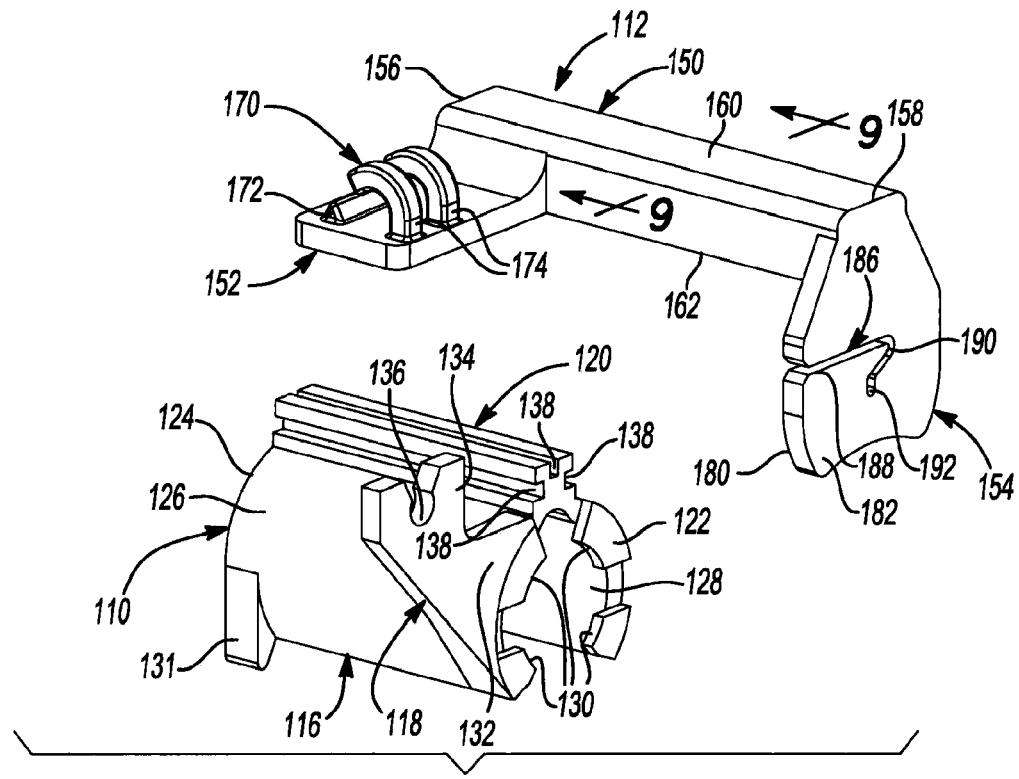
FIG. 7 is an exploded perspective view of first and second members of a coupling of the shifter assembly.

The coupling 94 may include a first member 110, a second member 112, and a spring 114. The first member 110 may include a body portion 116, a first extension arm 118, and a key feature 120 (FIG. 7). The body portion 116 may include a first end 122, a second end 124, an arcuate outer surface 126 and an arcuate inner surface 128 forming a sleeve. The inner surface 128 may include a radius that is sized to allow the shift lever 16 to be received within the body portion 116. The first end 122 may include one or more inwardly extending tabs 130 and the second end 124 may include one or more outwardly extending tabs 131. The first member 110 may be slid and/or snapped onto the shift lever 16 such that the first end 80 of the shift lever 16 abuts the inwardly extending tabs 130 (FIG. 6), and the base portion 52 of the shift stub 32 abuts the outwardly extending tab 131 (FIGS. 4 and 5). While the first member 110 is described above as being a discrete component attached to the shift lever 16, in some embodiments, the first member 110 may be integrally formed with the shift lever 16 or the base portion 52 of the shift stub 32.

The first extension arm 118 may be disposed at or proximate to the first end 122 and may include a first portion 132 extending outwardly from the outer surface 126 and a second portion 134 extending upward from the first portion 132 (relative to the view shown in FIG. 7). The first extension arm 118 may include a generally C-shaped slot 136 that may be formed in the second portion 134. The slot 136 may be sized to allow the sheath 46 or the first cable 44 to be snapped into engagement with the slot 136 (FIG. 6) such that the first cable 44 is retained at a predetermined lateral distance from the body portion 116 and the first cable 44 and is allowed to reciprocate relative to the slot 136. In another embodiment of the first member 110 shown in FIG. 10, the first extension arm 118 may be formed without the second portion 134. In such an embodiment, the slot 136 may be formed in the first portion 132.

Figure 10:
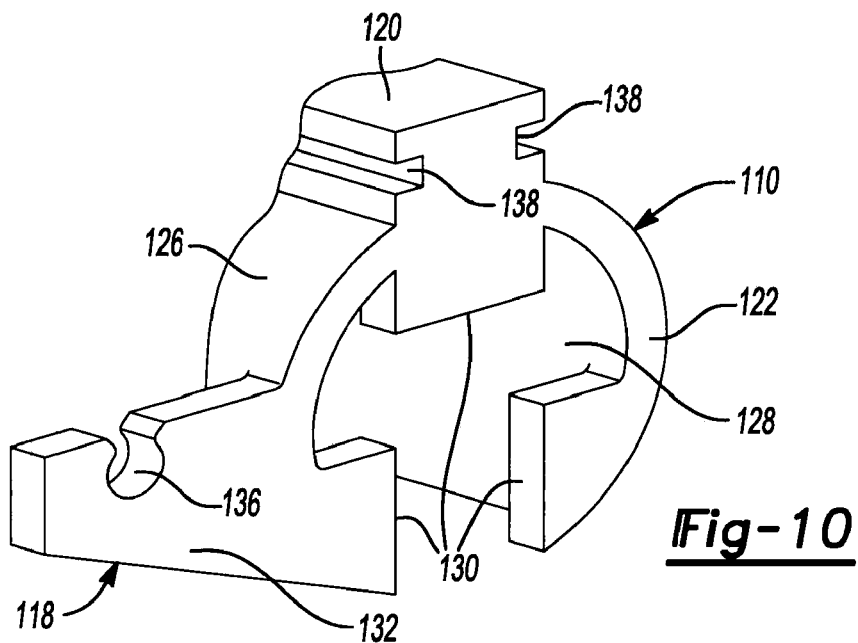
FIG. 10 is a partial perspective view of another embodiment of a first member of the coupling according to the principles of the present disclosure.

The key feature 120 may protrude from the outer surface 126 of the body portion 116 and may extend longitudinally between the first and second ends 122, 124 of the body portion 116. A profile of the key feature 120 may be generally rectangular and may include a plurality of grooves 138 formed therein. While FIG. 7 illustrates the key feature 120 having three longitudinally extending grooves 138, in other embodiments, the key feature 120 may include more or fewer grooves 138, as shown in FIG. 10, for example.

The second member 112 may include an elongated body portion 150, a second extension arm 152, and a base 154. The elongated body portion 150 may include a first end 156, a second end 158, a first side 160, and a second side 162. The second side 162 may include a groove feature 164 (FIGS. 8 and 9) extending between the first and second ends 156, 158. The groove feature 164 may be sized to slidably engage the key feature 120 in the first member 110 and may include a plurality of protuberances 166 that engage the grooves 138 in the key feature 120.

The second extension arm 152 may extend outward from the elongated body portion 150 at or proximate to the first end 156 and may include a retaining feature 170. The retaining feature 170 may include a boss 172 and one or more resiliently flexible arcuate fingers 174. The retaining feature 170 may be substantially aligned with the slot 136 in the first extension arm 118, as shown in FIG. 6. The stop 49 on the second end 47 of the first cable 44 may engage the retaining feature 170 via a snap-fit.

Figure 8:
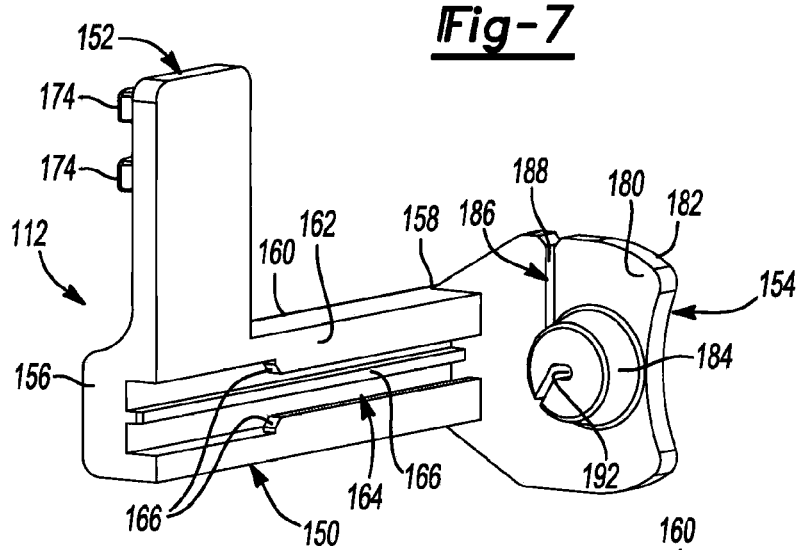
FIG. 8 is a perspective view of a second member of the coupling of FIG. 7.
Figure 9:
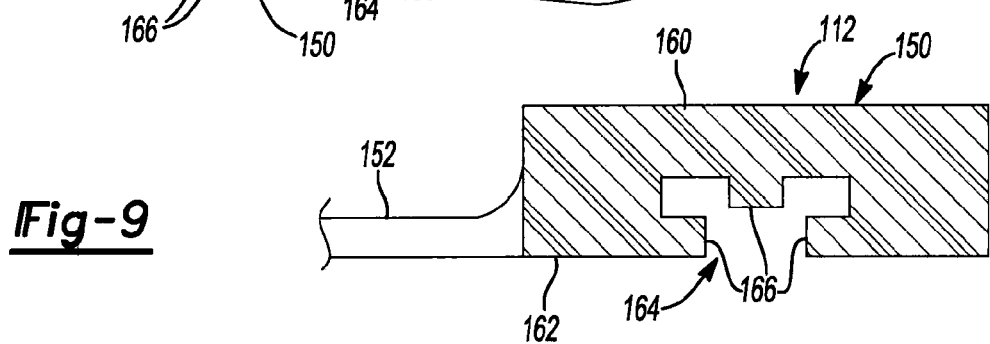
FIG. 9 is a partial cross-sectional view of the second member of FIG. 6 at line 9-9.

The base 154 may extend generally downward from the elongated body portion 150 (relative to the view shown in FIG. 7) at or proximate to the second end 158 and may include a first side 180 (FIG. 8) and a second side 182 (FIG. 7). The first side 180 may include a cylindrical or frusto-conical boss 184 extending away from the second side 182. A slot 186 may be disposed through the first and second sides 180, 182 and may include a generally linear portion 188, a serpentine portion 190, and a seat portion 192. The slot 186 may be sized such that the second cable 90 may be received therein and engage the seat portion 192. At least a portion of the slot 186 may extend through the boss 184 such that the seat portion 192 may be disposed through a center of the boss 184 (FIG. 8). As shown in FIG. 6, the stop 100 on the second end 98 of the second cable 90 may abut the second side 182 of the base 154.

The spring 114 may be a compression coil spring or any other resiliently compressible member and may include a first end seated against the first end 80 of the shift lever 16 and a second end seated against the base 154 of the second member 112 and may engage the boss 184. The first and second ends of the spring 114 may be adhesively bonded, soldered, or otherwise secured to the first end 80 and base 154, respectively. The second cable 90 may extend through a center of the spring 114, as shown in FIGS. 3-6. The spring 114 may bias the base 154 of the second member 112 away from the first end 80 of the shift lever 16, thereby generating tension in the second cable 90 and biasing the actuation member 92 toward the first position (FIG. 4). While the first end of the spring 114 is described above as being seated against the first end 80 of the shift lever 16, in some embodiments, the first end of the spring 114 may engage the first end 122 of the first member 110.

With particular reference to FIG. 3, the shifter assembly 10 may be assembled and installed into a vehicle modularly. For example, a first module 200 may include the shift tower assembly 12 and the reverse lockout mechanism 14 and a second module 202 may include the shift lever 16 and the reverse lockout release mechanism 18. The first and second modules 200, 202 may be preassembled prior to being assembled to each other and/or installed into the vehicle.

At an assembly plant, the first module 200 may be assembled onto the transmission assembly 20. Thereafter, the floor pan 24 can be installed over the first module such that at least a portion of the shift tower assembly 12 protrudes through the aperture 22 of the floor pan 24. The cable guide 42 may retain the first cable 44 in a generally upright position and generally within a footprint of the aperture 22. In this manner, the first cable 44 is less likely to be damaged or trapped under the floor pan 24 during installation of the floor pan 24. Thereafter, the second module 202 may be assembled as a unit onto the first module 200 at any appropriate time, such as during assembly of an interior or cabin portion of the vehicle, for example.

With reference to FIGS. 1-9, operation of the shifter assembly 10 will be described in detail. A driver of the vehicle may grip the knob 86 and move the shift lever 16 relative to the shift tower assembly 12, causing the shift finger 50 to engage one of the shift rails 54 to shift the transmission assembly 20 among the neutral position and one of the plurality of forward-gear positions. To shift the transmission assembly 20 into the reverse-gear position, the driver may grip the annular lip 102 of the actuation member 92 and slide the actuation member 92 upward from the first position (FIG. 4) to the second position (FIG. 5) against the biasing force of the spring 114. Such movement of the actuation member 92 pulls the second cable 90 upward through the bore 84 in the shift lever 16, which in turn causes corresponding movement of the second member 112 of the coupling 94 relative to the first member 110. Such movement of the second member 112 causes corresponding movement of the first cable 44 (which is attached to the second extension arm 152). The upward movement of the first cable 44 exerts an upward force on the first end 64 of the lever 60, causing the lever 60 to pivot in a clockwise direction (relative to the view shown in FIG. 2) about the pin 70, thereby raising the cam portion 68 above the upwardly sloping portion 74 of the ramp member 72. In this position, the lockout member 62 and the shift finger 50 are allowed unimpeded movement into a position corresponding to the reverse-gear position of the transmission assembly 20.

Figure 11:
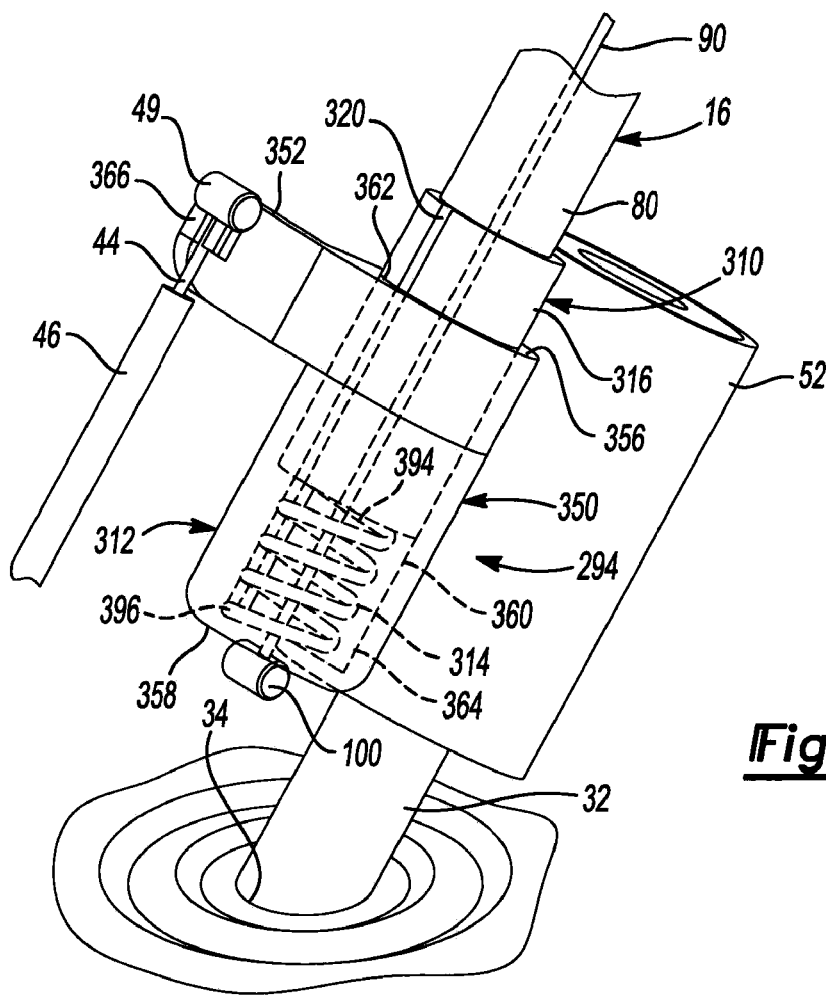
FIG. 11 is a partial perspective view of another embodiment of a coupling according to the principles of the present disclosure.

With reference to FIG. 11, another embodiment of the coupling 94 is provided and will be referred to as the coupling 294. The coupling 294 may include a first member 310, a second member 312, and a spring 314. The structure of the first member 310 may be generally similar to that of the first member 110 described above, except the first member 310 does not include an extension arm. The first member 310 may include a body portion 316 and a key feature 320. The first member 310 may be mounted to the shift lever 16 at or near the first end 80. In some embodiments, the first member 310 may be integrally formed with the shift lever 16.

The second member 312 may include a body portion 350 and an extension arm 352. The body portion 350 may include a first end 356, a second end 358, and a cavity 360. The cavity 360 may include an opening 362 at the first end 356 and an arcuate inner surface 364 that is sized to slidably receive the body portion 316 of the first member 310. The inner surface 364 may include a groove feature that engages the key feature 320 of the first member 310. The second end 358 may include an aperture extending into the cavity 360. The second cable 90 may extend through the cavity 360 and through the aperture in the second end 358. The stop 100 attached to the second end 98 of the second cable 90 may abut the second end 358. The extension arm 352 may extend outward from the body portion 350 at or proximate to the first end 356 and may include a cable engagement feature 366. The first cable 44 may engage the cable engagement feature 366 via a snap-fit.

The spring 314 may be disposed within the cavity 360 and may include a first end 394 and a second end 396. The first end 394 may be seated against the first member 310 or the first end 80 of the shift lever 16, and the second end 396 may be seated against an interior surface of the second end 358 of the second member 312. Moving the actuation member 92 from the first position to the second position causes the second cable 90 to pull the second member 312 of the coupling 294 upward relative to the first member 310. Such upward motion of the second member 312 pulls the first cable 44 upward, which in turn causes the lever 60 of the reverse lockout mechanism 14 to pivot about the pin 70, thereby allowing unimpeded motion of the lockout member 62 and the shift finger 50, as described above.

While one or more specific examples have been described and illustrated, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof.

What is claimed is:

1. A shifter assembly comprising:
a shift lever adapted to be connected to a housing for pivotable motion relative to the housing;
an actuation member connected to the shift lever and movable relative thereto between a first position and a second position;
a coupling connected to the shift lever and including a first member and a second member slidably engaging each other;
a first cable having a first end connected to the second member and a second end adapted to be coupled to a reverse lockout mechanism;
a second cable connected to the actuation member and the second member of the coupling such that movement of the actuation member relative to the shift lever causes corresponding motion of the second member relative to the shift lever; and
wherein movement of the actuation member from the first position to the second position is adapted to cause corresponding movement of the reverse lockout mechanism to allow movement of the shift lever into a reverse gear position.

2. The shifter assembly of claim 1, further comprising a spring engaging the first and second members of the coupling and urging the actuation member toward the housing.

3. The shifter assembly of claim 1, wherein the actuation member is a ring engaging the shift lever proximate a first end thereof, the ring being axially slidable relative to the shift lever.

4. The shifter assembly of claim 1, wherein the second cable extends through an axially extending bore in the shift lever.

5. The shifter assembly of claim 1, wherein the first cable is adapted to extend through the housing and is adapted to engage the reverse lockout mechanism disposed proximate a lower aperture of the housing.

6. The shifter assembly of claim 1, wherein the second member of the coupling includes a cavity receiving the first member and reciprocates relative thereto in response to movement of the actuation member between the first and second positions.

7. The shifter assembly of claim 6, further comprising a resiliently compliant member disposed in the cavity of the second member between the second end of the shift lever and a bottom surface of the cavity, the resiliently compliant member biasing the second member away from the second end of the shift lever.

8. The shifter assembly of claim 1, wherein the first member is connected to the second end of the shift lever and includes a first engagement feature and the second member includes a second engagement feature slidably engaging the first engagement feature.

9. The shifter assembly of claim 1, wherein the first cable slidably engages an extension arm extending radially from the first member.

10. The shifter assembly of claim 1, wherein the second member engages the first cable via a snap fit.

11. The shifter assembly of claim 1, wherein the second member of the coupling includes a slot engaging the second cable.

12. A shifter assembly for a vehicle comprising:
a shift tower assembly coupled to a transmission;
a shift lever including a first end, a second end, and a bore extending between the first and second ends, the shift tower assembly connecting the shift lever to a transmission component;
an actuation member slidably engaging the shift lever proximate the first end;
a coupling disposed at the second end of the shift lever and including a first member movable relative to the shift lever;
a first cable having a first end engaging the coupling and a second end engaging a reverse lockout mechanism;
a second cable extending through the bore in the shift lever and having a first end engaging the actuation member and a second end engaging the coupling;
wherein movement of the actuation member causes corresponding movement of the reverse lockout mechanism to allow unimpeded movement of the shift lever into a reverse gear position.

13. The shifter assembly of claim 12, wherein the first cable extends through the shift tower assembly and the shift tower assembly is directly mounted to the transmission.

14. The shifter assembly of claim 13, wherein the actuation member includes an annular member movable between a first position and a second position, and movement between the first and second positions causes corresponding movement of the first member relative to the shift lever and the shift tower assembly.

15. The shifter assembly of claim 12, wherein the coupling includes an extension arm engaging the first end of the first cable such that the second end of the second cable engaging the coupling is axially misaligned with the first end of the first cable engaging the extension arm.

16. The shifter assembly of claim 12, wherein respective ends of the first and second cables that engage the coupling are axially misaligned relative to each other.

17. The shifter assembly of claim 12, wherein the coupling includes a second member fixed relative to the shift lever, the first member slidably engaging the second member such that movement of the actuation member causes movement of the first member relative to the second member, the first end of the first cable and the second end of the second cable being coupled to the first member.

18. The shifter assembly of claim 17, wherein the first member of the coupling includes a cavity having an opening and a bottom portion, the cavity slidably receiving the second member, the bottom portion engaging the second end of the second cable.

19. The shifter assembly of claim 12, wherein the coupling includes a spring disposed between the first member and the second end of the shift lever, the spring biasing the first member and the actuation member towards the shift tower assembly.

* * * * *